United States Patent Office 3,636,051
Patented Jan. 18, 1972

3,636,051
PROCESS FOR PURIFICATION OF DICYCLOPENTADIENE DIEPOXIDE
Rudolph Rosenthal, Broomall, and Joseph A. Kieras, Lincoln University, Pa., assignors to Atlantic Richfield Company, New York, N.Y.
No Drawing. Filed Nov. 4, 1969, Ser. No. 874,082
Int. Cl. C07d 1/06
U.S. Cl. 260—348 C
10 Claims

ABSTRACT OF THE DISCLOSURE

Dicyclopentadiene diepoxide prepared by the epoxidation of dicyclopentadiene with tertiary butyl hydroperoxide or tertiary amyl hydroperoxide in the presence of a molybdenum catalyst contains small amounts of carbonyl compounds which interfere with the subsequent use of this material as an intermediate in the preparation of polyethers by giving highly colored undesirable products. The carbonyl compounds are removed from dicyclopentadiene diepoxide in this process by one or more recrystallizations of the compound from a mixture of a ketone and a paraffinic hydrocarbon solvent.

BACKGROUND OF THE INVENTION

Field of the invention

This invention relates to a method for the purification of dicyclopentadiene diepoxide and, in particular, to the removal of carbonyl compounds from such compound by one or more recrystallizations from a mixed solvent consisting of a paraffnic hydrocarbon and an aliphatic ketone.

Prior art

No prior art processes are known for removing carbonyl compounds from dicyclopentadiene diepoxide. Since the diepoxide is a high melting and the high boiling compound, distillation is not a siutable purification method. The carbonyl compounds if allowed to remain in the dicyclopentadiene diepoxide give highly colored undesirable products when the diepoxide is utilized in the preparation of polyethers. The process of the instant invention accomplishes the desired result of removing carbonyl compounds.

SUMMARY OF THE INVENTION

In accordance with this invention crude dicyclopentadiene diepoxide containing carbonyl compounds is recrystallized one or more times from a mixed solvent consisting of a paraffinic hydrocarbon having from 5 to 12 carbon atoms and an aliphatic ketone having from 3 to 6 carbon atoms with the alkyl groups attached to the carbonyl group having from 1 to 4 carbon atoms.

It is an object of this invention therefore to provide a method for the purification of crude dicyclopentadiene diepoxide containing carbonyl compounds.

It is another object of this invention to remove carbonyl compounds from crude dicyclopentadiene diepoxide containing such compounds by crystallization of the dicyclopentadiene diepoxide from mixed ketone-hydrocarbon solvents.

Other objects of this invention will be apparent from the description of the preferred embodiments and from the claims which follow.

DESCRIPTION OF THE PREFERRED EMBODIMENTS

The crude dicyclopentadiene diepoxide containing carbonyl compounds is obtained when the diepoxide is produced from dicyclopentadiene utilizing a molybdenum-containing catalyst and an oxidizing agent comprising tertiary butyl hydroperoxide and tertiary butyl alcohol obtained by the liquid phase non-catalytic oxidation of isobutane with molecular oxygen or an oxidizing agent comprising tertiary amyl hydroperoxide and tertiary amyl alcohol obtained by the liquid phase non-catalytic oxidation of isopentane with molecular oxygen. Such epoxidation reaction is carried out at temperatures in the range of from 75° C. to 150° C. utilizing the autogenous pressure of the reaction at the temperature employed. The mole ratio of hydroperoxide to alcohol can range from 5:1 to 1:5 and the mole ratio of hydroperoxide to dicyclopentadiene can range from 2.0:1 to 2.25:1. This method is more fully described in our copending application filed of even date herewith and entitled "Process for Single Step Synthesis of Dicyclopentadiene Diepoxide."

The paraffinic hydrocarbons which can be utilized as a portion of the mixed solvent can be either straight or branched chain and have from 5 to 12 carbon atoms in the molecule. Examples are pentane, isopentane, the hexanes, the heptanes, the octanes, the nonanes, the decanes, the undecanes and bodecanes.

A particularly preferred paraffin hydrocarbon is isooctane, i.e. 2,2,4-trimethylpentane. In general, the paraffinic hydrocarbons having from 5 to 8 carbon atoms are preferred since they are more easily separated from the crystallized dicyclopentadiene diepoxide.

The ketones useful for the process of this invention are the aliphatic ketones having from 3 to 6 carbon atoms in the molecule and the alkyl groups which are attached to the carbonyl group can have from 1 to 4 carbon atoms and can be straight or branched chain. Examples are acetone, methyl ethyl ketone, methyl propyl ketone, diethyl ketone, methyl isopropyl ketone, ethyl propyl ketone, methyl isobutyl ketone and the like. Acetone and methyl ethyl ketone are the preferred compounds because of their ease of removal from the crystallized dicyclopentadiene diepoxide. The range of ketone to hydrocarbon weight ratio can be from 1:10 to 3:10 with a preferred range of from 1.5:10 to 2.5:10.

In addition mixtures of the hydrocarbons can be used in conjunction with a single ketone, or a single hydrocarbon can be used with a mixture of the ketones, or mixtures of the hydrocarbons can be used with mixtures of the ketones.

The range of solvent to diepoxide weight ratio can be from 1:1 to 20:1 and is preferably from 5:1 to 10:1. The process of this invention is carried out by dissolving the dicyclopentadiene diepoxide in the mixture of hydrocarbon and ketone. If sufficient solvent is present this can be carried out at room temperature or slightly above and, in general, warming to about 50° C. is sufficient to completely dissolve the dicyclopentadiene diepoxide. The temperature is then lowered to a temperature sufficiently low to crystallize out the diepoxide. Preferably this temperature is in the range of between −40° C. and +30° C. The particular temperature employed depends upon the ratio of solvent to diepoxide and the concentration of ketone in the solvent. The diepoxide is more soluble in the ketone than in the hydrocarbon and, accordingly, the lower the ratio of ketone to diepoxide in the crystallization mixture the higher the crystallization temperature that can be used. Obviously the temperature employed should be sufficiently low to give a good yield of the product and not allow large amounts to remain in solution. After separating the crystals from the solvent by filtration the procedure can be repeated if desired one or more times. In general, from 2 to 4 and most frequently three crystallizations are sufficient to substantially completely remove all of the carbonyl compounds from the dicyclopentadiene diepoxide.

The following examples are provided to further illustrate the invention.

EXAMPLE I

Into a 500 ml. stainless steel autoclave were charged 46.5 g. dicyclopentadiene (0.352 mole), 125 g. tertiary butyl hydroperoxide-tertiary butyl alcohol solution prepared by oxidation of isobutane (53.7 weight percent tertiary butyl hydroperoxide, 0.747 mole), and 8 g. of a molybdenum catalyst solution containing 5000 p.p.m. by weight of molybdenum prepared by reacting molybdenum metal powder with tertiary butyl hydroperoxide in the presence of propylene glycol. The reactor was heated to 119–124° C. for one hour with stirring, cooled to 80° C. and the contents removed from the autoclave. The tertiary butyl alcohol was removed on a rotary evaporator at 60° C. at 2 mm. Hg pressure. The residue was taken up in 250 ml. of isooctane (2,2,4-trimethylpentane), boiled with 3 g. activated charcoal, filtered to remove charcoal, and the filtrate cooled to room temperature. Filtration gave 38.5 g. of crude dicyclopentadiene diepoxide, M.P. 178–181° C. The filtrate was cooled to —30° C. and refiltered giving an additional 8.5 g. M.P. 150–155° C. This represents an 82 mole percent yield of crude dicyclopentadiene diepoxide.

This example shows the method for producing dicyclopentadiene diepoxide.

EXAMPLE II

The crude dicyclopentadiene diepoxide produced in accordance with Example I was found by infrared analysis to contain 0.18 weight percent carbonyl group. This crude dicyclopentadiene diepoxide was heated to 30–35° C. with a mixture of isooctane and acetone (4:1 weight ratio of isooctane to acetone) to dissolve all of the diepoxide. Ten grams of solvent per gram of diepoxide was employed. The mixture was then cooled to —30° C. to precipitate the diepoxide. After filtering the crystallized diepoxide from the solvent the crystals were redissolved and reprecipitated in the same manner twice again, giving a total of three solutions and crystallization cycles. The final product showed complete absence of carbonyl group both by infrared and gas-liquid chromatographic analysis. The melting point of the final product was 190° C., which was additional evidence that a high purity product had been obtained.

EXAMPLE III

Similar results are obtained with other paraffin hydrocarbons in the $C_5$ to $C_{12}$ range in admixture with ketones in the $C_3$ to $C_6$ range and when mixtures of hydrocarbons and mixtures of ketones are employed in accordance with the method of Example II.

EXAMPLE IV

Samples of crude dicyclopentadiene diepoxide produced in the manner described in Example I containing from 0.18 to 0.20 weight percent carbonyl group were employed in a series of runs investigating other solvent systems. The same procedure utilized in Example II was followed with isooctane alone, benzene-isooctane, tertiary butyl alcohol-isooctane, ethyl ether-isooctane, chloroform-isooctane, and ethyl acetate-isooctane. All of these systems gave substantially no reduction in the amount of carbonyl impurity, thus showing that the hydrocarbon-ketone system of this invention is unique.

We claim:

1. A method for the removal of carbonyl compounds from crude dicyclopentadiene diepoxide containing such compounds which comprises dissolving said crude dicyclopentadiene diepoxide in a mixed solvent consisting essentially of a paraffinic hydrocarbon having from 5 to 12 carbon atoms in the molecule or a mixture of such paraffinic hydrocarbons and an aliphatic ketone having from 3 to 6 carbon atoms in the molecule or mixture of such ketones, cooling the resulting solution to a temperature sufficient to cause crystallization of the dicyclopentadiene diepoxide therefrom and recovering the crystalllized dicyclopentadiene diepoxide substantially free of said carbonyl compounds.

2. The method according to claim 1 wherein the paraffinic hydrocarbon has from 5 to 8 carbon atoms.

3. The method according to claim 2 wherein the paraffinic hydrocarbon is 2,2,4-trimethylpentane.

4. The method according to claim 1 wherein the ketone is acetone.

5. The method according to claim 1 wherein the ketone is methylethylketone.

6. The method according to claim 1 wherein the ketone to hydrocarbon ratio is in the range of from 1:10 to 3:10.

7. The method according to claim 6 wherein the ketone to hydrocarbon weight ratio is from 1.5:10 to 2.5:10.

8. The method according to claim 1 wherein the solvent to diepoxide weight ratio is from 1:1 to 20:1.

9. The method according to claim 1 wherein the solution and crystallization procedure is carried out from two to four times.

10. The method according to claim 1 wherein the solution is cooled and crystallization is carried out at a temperature in the range of from —40° C. to +30° C.

No references cited.

NORMA S. MILESTONE, Primary Examiner